United States Patent

Quere

(10) Patent No.: US 9,243,957 B2
(45) Date of Patent: Jan. 26, 2016

(54) DEVICE AND METHOD FOR CHARACTERIZING A LIGHT BEAM

(75) Inventor: Fabien Quere, Vélizy Villacoublay (FR)

(73) Assignee: Commissariat A L'Energie Atomique Et Aux Energies Alternatives, Paris (FR)

(*) Notice: Subject to any disclaimer, the term of this patent is extended or adjusted under 35 U.S.C. 154(b) by 0 days.

(21) Appl. No.: 14/124,781

(22) PCT Filed: Jun. 8, 2012

(86) PCT No.: PCT/IB2012/052910
§ 371 (c)(1),
(2), (4) Date: Dec. 11, 2013

(87) PCT Pub. No.: WO2012/172463
PCT Pub. Date: Dec. 20, 2012

(65) Prior Publication Data
US 2014/0098367 A1    Apr. 10, 2014

(30) Foreign Application Priority Data
Jun. 14, 2011 (FR) ..................... 11 55185

(51) Int. Cl.
*G01B 9/02* (2006.01)
*G01J 3/45* (2006.01)
*G01J 11/00* (2006.01)
*G01J 9/02* (2006.01)

(52) U.S. Cl.
CPC .... *G01J 3/45* (2013.01); *G01J 9/02* (2013.01); *G01J 11/00* (2013.01); *G01J 2009/0238* (2013.01)

(58) Field of Classification Search
CPC ..... G01J 2009/0238; G01J 11/00; G01J 9/02; G01J 2009/0226; G01B 9/02084
See application file for complete search history.

(56) References Cited

U.S. PATENT DOCUMENTS

| 7,817,282 B2 | 10/2010 | Bowlan et al. |
| 2008/0285031 A1* | 11/2008 | Bowlan et al. ............. 356/326 |
| 2011/0235049 A1* | 9/2011 | Burnett et al. ............. 356/484 |

OTHER PUBLICATIONS

International Search Report and Written Opinion for Application No. PCT/IB2012/052910 dated Sep. 13, 2012.
Cohen, J. et al., *Single-Shot Multiple-Delay Crossed-Beam Spectral Interferometry for Measuring Extremely Complex Pulses*, Optics Communication, vol. 284, No. 15 (Feb. 2011) 3785-3794.
Coughlan, M. A. et al., *Creating Multiple Longitudinal Foci With Parametric Spatio-Temporal Focusing*, Proc. of SPIE, vol. 7570 (Jan. 2010) 75700R-1-75700R-10.

* cited by examiner

*Primary Examiner* — Gregory J Toatley
*Assistant Examiner* — Shawn Decenzo
(74) *Attorney, Agent, or Firm* — Alston & Bird LLP

(57) ABSTRACT

Method of characterizing a light beam having the steps of: a) disposing the input ends of N >3 optical fibers on the path of the light beam, in such a way that a respective portion of the beam is coupled and propagates in each optical fiber and is emitted from its output end so as to form a respective secondary beam; b) introducing an angular spectral dispersion into the secondary beams by means of at least one dispersive element; c) propagating the dispersed secondary beams in such a way that they overlap to form an interferogram; d) acquiring an image of the interferogram; and e) extracting from the image of the interferogram an item of information relating to the spatial variation of the phase of the light beam at a plurality of wavelengths. Device for the implementation of such a method.

14 Claims, 6 Drawing Sheets

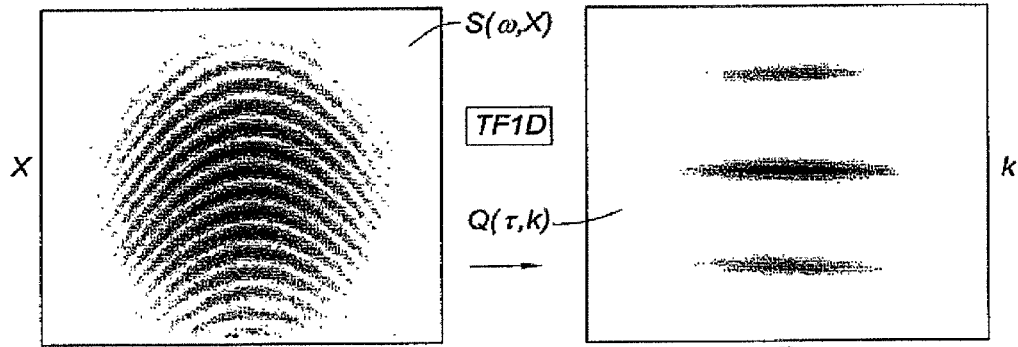
Fig. 3A
PRIOR ART
Fig. 3B
PRIOR ART
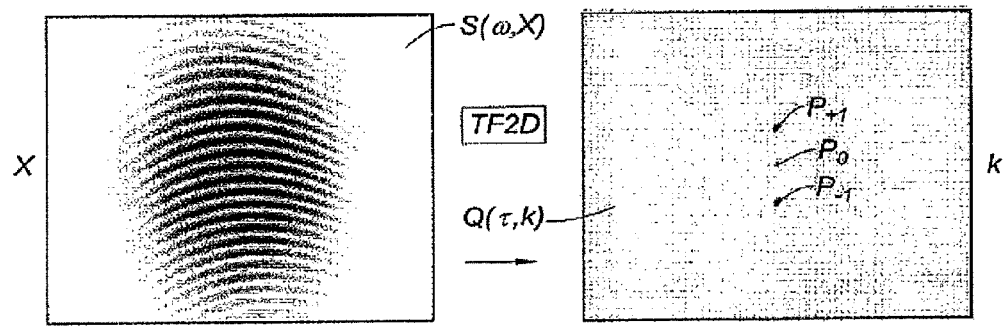
Fig. 4A
Fig. 4B
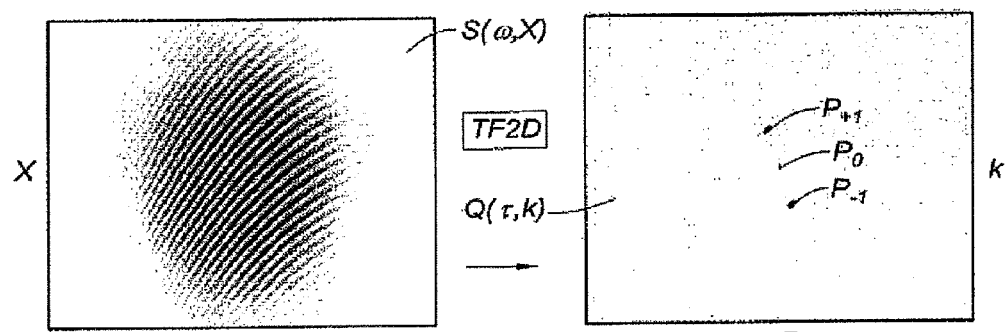
Fig. 5A
Fig. 5B

DEVICE AND METHOD FOR CHARACTERIZING A LIGHT BEAM

FIELD

The invention pertains to a device and to a method for characterizing a light beam, and especially a laser beam. The device and the method of the invention make it possible especially to determine the spatio-temporal properties of a light beam and in particular of a pulsed laser beam, comprising one or more laser pulses of picosecond or femtosecond duration. More generally, the device of the invention can be used to measure the cross-spectral density of a light beam, even one which is not pulsed.

The invention will be more particularly described in relation to its applications to the characterization of ultra-brief laser pulses exhibiting spatio-temporal couplings, although these uses are not exclusive.

BACKGROUND

The expression "ultra-brief laser pulse" is intended to mean a picosecond pulse (duration of between about 0.1 and 100 ps) or femtosecond pulse (duration of less than or equal to 100 fs=0.1 ps). The durations are understood to be at mid-height of the intensity profile. These pulses necessarily exhibit a relatively wide spectral band, in a manner well known per se.

Ultra-brief laser pulses exhibit numerous scientific and technological applications; they can be amplified up to energies of several Joules and form beams ("pulsed beams") whose diameter ranges from a few millimeters to several centimeters as a function, in particular, of their power.

Generally, the temporal properties of the electromagnetic field of a pulsed beam can vary spatially or, equivalently, the spatial properties can depend on time. For example, the pulse duration can depend on the position (x,y) in the beam (hereinafter, unless indicated otherwise, consideration will always be given to a beam propagating in a "z" direction, the "x", "y" and "z" axes forming a right-handed orthonormal reference frame).

When such a dependency exists, the field $E(x,y,t)$ cannot be cast into the form $E(x,y,t)=E_t(t) \cdot E_{ES}(x,y)$, where $E_t(t)$ is a function of time and $E_{ES}(x,y)$ a function of space. The beam is then said to exhibit spatio-temporal coupling ("STC" standing for "Space-Time Coupling").

Spatio-temporal couplings can lead in particular to a distortion, illustrated with the aid of FIGS. 1A and 1B, of the intensity front of a pulsed beam. The electromagnetic energy of an ultra-brief pulsed beam is, in the ideal case, distributed in a very slender disk (FIG. 1A) of diameter D and of thickness cT, where c is the speed of light and T the duration of the pulse; in the example of FIG. 1A, D=8 cm and cT=10 μm, thus corresponding to a pulse duration of about 33 fs. In order to maximize the luminous intensity obtained at the focus, this generally being desired, this disk must be as "flat" as possible. To characterize this spatial distribution of the energy, one speaks of the "intensity front" of the laser (not to be confused with the "wavefronts", which depend on the wavelength).

In practice, and in particular in the case of high-power lasers with large beam diameter, the intensity fronts might not be plane, but distorted as illustrated in FIG. 1B. Consequently, the peak of the pulse may be attained at different instants in the various points of the cross section of the beam in the (x,y) plane, and the pulse duration may also vary from one point to another.

Other spatio-temporal types of coupling are also possible, such as for example a rotation of the wavefronts over time. For a general account of the theory of spatio-temporal couplings, refer to the article by S. Akturk et al. "*The general theory of first-order spatio-temporal distortions of Gaussian pulses and beams*», Optics Express Vol. 13, No. 21, pages 8642-8661.

Methods for measuring these couplings have been proposed, but they remain limited in their performance and complex to implement, hence they are not very widespread. The "SPIDER-2D" technique arises out of the "SPIDER" scheme (standing for "Spectral Phase Interferometry for Direct Electric Field Reconstruction"), introduced in 1998 for measuring the temporal structure of an ultra-brief pulse at a point in space. It combines spectral-shift interferometry (standard SPIDER technique) and spatial-shift interferometry to reconstruct the spectral phase $\phi(x,y,\omega)$ along a spatial direction ($\omega$ being the angular frequency, related to the wavelength λ by the relation $\lambda=2\pi c/\omega$). In practice, this technique consists in acquiring an image of an interferogram on the sensor of a CCD camera; the dimensions of this image correspond on the one hand to the frequency ω, and on the other hand to a spatial coordinate. This spatial coordinate may be either the x coordinate or the y coordinate of the (x,y) plane perpendicular to the direction of propagation of the beam.

This technique requires a complex setup to produce several replicas of the initial beam and manipulate them with the aid, inter alia, of a nonlinear crystal. Consequently, it is difficult and expensive to implement. Furthermore, as one of the coordinates of the interferogram corresponds to a spatial coordinate transverse to the beam, this technique allows only the characterization of relatively small beams, of smaller diameter than that of the CCD sensor of the camera (typically 1 cm or less). In the case of beams of larger diameter (for example, issuing from a high-power source), it is necessary to reduce the size thereof by means of a telescope, which is liable to induce spurious spatio-temporal couplings. Another drawback is that the principle of the technique makes it necessary to perform the measurement according to a single transverse spatial coordinate, x or y.

The so-called "STRIPED FISH" technique utilizes a measurement of the spatial interferences between the beam to be characterized and a so-called reference beam, doing so for a set of frequencies in the spectrum of the beam to be characterized. The reference beam must exhibit a spectrum which encompasses that of the beam to be characterized, and have a phase $\phi_0(x,y,\omega)$ that is known at every point and for all frequencies. The interferograms make it possible to compare, for a set of frequencies $\omega_i$, the phase $\phi(x,y,\omega)$ of the beam to be characterized, with the known phase $\phi_0(x,y,\omega)$ of the reference beam. This technique is much simpler to implement than SPIDER-2D, and a single measurement makes it possible to characterize the beam in the two transverse directions x and y. On the other hand, the diameter of the beam must be small relative to the size of the CCD sensor used to acquire the images of the interferograms; this beam size limitation is still more constraining than in the case of SPIDER-2D.

The closest prior art consists of a third technique, called "SEA TADPOLE", which is described in patent U.S. Pat. No. 7,817,282 and in the article by Bowlan et al "*Directly measuring the spatio-temporal electric field of focusing ultrashort pulses*" Optics Express, 15 10219 (2007). As illustrated in FIG. 2, this technique consists in collecting the light at various points of the beam to be characterized FL with a monomode fiber F1. This collection of light in the unknown beam can be done either at the focus of a focusing optic, or on an unfocused beam. An auxiliary beam FA, of spectral phase $\phi_{aux}(\omega)$, is injected into a second monomode fiber F2. The exit ends of the two fibers are placed side by side; a convergent lens L1 deviates the beams exiting the fibers in such a way that they overlap spatially, thus producing spatial interferences which are resolved spectrally with the aid of a spectrometer SPM comprising a diffraction grating RD and a cylindrical lens L2 (the reference FE identifies the entry slit of the spectrometer, perpendicular to the direction of dispersion of the latter). An interferogram $S(\omega,X)$ is thus obtained, where X is the spatial coordinate normal to the direction of dispersion of the spectrometer, an image of which is acquired by virtue of a sensor of CCD type, identified by the reference CI.

It is possible to use this interferogram to determine the spectral phase difference between the pulses injected into the two fibers. The intensity $S(\omega,X)$ measured on the CCD sensor of the spectrometer as a function of $\omega$ and X is given by:

$$S(\omega,X) = S_{aux}(\omega) + S_{inc}(\omega) + 2\sqrt{S_{aux}(\omega)S_{inc}(\omega)}\cos(2\omega \sin\theta X/c + \phi_{inc}(\omega) - \phi_{aux}(\omega)) \quad (1)$$

where $S_{aux}$ and $S_{inc}$ are respectively the spectral intensities of the auxiliary pulse and pulse to be characterized which are injected into the fibers, $\phi_{aux}$ and $\phi_{inc}$ their spectral phases at the fiber exit, $\theta$ is the half-angle between the beams, $\theta = a\tan(d/(2L))$, where d is the distance between the fibers and L the distance between fiber exits and detector. An exemplary interferogram $S(\omega,X)$ is presented in FIG. 3A.

The interference term in equation (1), which will be denoted by $J(\omega,X)$, contains information on the phase difference $\Delta\phi(\omega) = \phi_{inc} - \phi_{aux}$ between the pulses which have been collected by the two fibers. To extract this information, the procedure used consists in calculating the Fourier transform of this function with respect to the variable X (TF1D: one-dimensional Fourier transform). As shown in FIG. 3B, this Fourier transform comprises three components in the ($\omega$, k) plane. The central component, which comprises only low frequencies, corresponds to the term $S_{aux} + S_{inc}$ in equation (1). The other two components correspond to the two complex exponentials of the following decomposition of the interference term:

$$J(\omega,X) = \sqrt{S_{aux}(\omega)S_{inc}(\omega)}(e^{i\phi} + e^{-i\phi}) \quad (2)$$

with $\phi = 2\omega \sin\theta \cdot X/c + \phi_{inc}(\omega) - \phi_{aux}(\omega)$.

If a single of these components is selected, for example by multiplying the Fourier transform by an appropriate filter, in particular supergaussian, and if an inverse Fourier transform is performed, the following function is obtained:

$$\tilde{J}(\omega,X) = \sqrt{S_{aux}(\omega)S_{inc}(\omega)}e^{i\phi} \quad (3)$$

the phase $\phi$ of which equals:

$\phi = 2\omega \sin\theta \cdot X/c + \phi_{inc}(\omega) - \phi_{aux}(\omega) = \phi_{geo}(\omega) + \Delta\phi(\omega)$.

The first term $\phi_{geo}(\omega)$ ("geometric") is simply induced by the angle used to generate spatial fringes. The second term $\Delta\phi(\omega) = \phi_{inc}(\omega) - \phi_{aux}(\omega)$ represents the spectral phase difference between the beams on exit from the two fibers, that is to say between a point of the beam to be characterized (corresponding to the entry end of the first fiber) and the auxiliary beam. One therefore proceeds in the following manner:

the interferogram $S(\omega,X)$ is measured and the processing hereinabove is performed for a given position $(x_0,y_0)$ of the first fiber in the beam to be characterized. From this is deduced $\phi_0 = 2\omega \sin\theta \cdot X/c + \phi(\omega,x_0,y_0) - \phi_{aux}(\omega)$;

the interferogram $S(\omega,X)$ is thereafter measured and the processing hereinabove is performed for a set of position $(x_i,y_i)$ of the fiber 1 in the beam to be characterized. A phase $\phi_i = 2\omega \sin\theta \cdot X/c + \phi(\omega,x_i,y_i) - \phi_{aux}(\omega)$ is deduced therefrom. The phase $\phi_0$ measured during the first shot is systematically subtracted. We thus obtain $\Delta\phi_i(\omega) = \phi(\omega,x_i,y_i) - \phi(\omega,x_0,y_0)$. This phase is independent of X, and can be averaged along this axis so as to improve the signal/noise ratio. By proceeding thus, all the points of the beam are therefore compared with the point $(x_0,y_0)$, using the auxiliary beam as intermediary.

It is thereafter possible to perform a measurement of SPIDER or FROG (standing for "Frequency Resolved Optical Gating") type at the point $(x_0,y_0)$, to determine the dependency of $\phi(\omega,x_0,y_0)$ versus frequency ($\omega$). We then have all the information required in order to reconstruct the field $E(x_i,y_i,t)$ of the laser beam, by a Fourier transform with respect to $\omega$, this to within a phase term, which term is almost independent of $\omega$ and which, as will be discussed further on, is introduced by the optical fibers.

This technique requires only an inexpensive setup that is relatively simple to achieve, and can be applied to beams of large size. On the other hand, as the phase is determined point by point, the characterization of a beam requires a large number of laser shots. This results in a significant acquisition time and sensitivity to temporal fluctuations and drifts of the laser source, to vibrations and to defects of positioning of the entry ends of the optical fibers.

Another limitation of the SEA TADPOLE technique consists in the fact that the optical fibers introduce random phase fluctuations, which cannot be measured (this point was briefly mentioned above). This implies that the electric field of the beam $E(x,y,t)$ cannot be reconstructed completely, but only except for an unknown phase term $\phi_{fluct}(x_i, y_i, \omega)$. If the information thus obtained makes it possible to determine, for example, the intensity fronts (by virtue of the assumption, confirmed by experiment, that $\phi_{fluct}$ depends does not depend on the frequency $\omega$), the phase fronts cannot be reconstructed.

SUMMARY

The invention takes the form of an enhancement of the SEA TADPOLE technique, and is aimed at solving at least some of its aforementioned drawbacks.

A first idea underlying the invention consists in using a plurality (N≥3) of optical fibers to collect light at several points of the beam simultaneously, and compare their phases with the aid of a setup similar to that of SEA TADPOLE. In this manner, the beam can be characterized using fewer laser shots, thereby making it possible to relax the conditions on its stability; at the limit, a "one-go" characterization becomes possible. Moreover, no auxiliary beam is required.

Thus, a subject of the invention is a method for characterizing a light beam comprising the steps consisting in:

a) arranging the entry ends of N≥3 optical fibers, preferably monomode fibers, on the route of said light beam, in such a way that a respective portion of said beam is coupled and propagates in each optical fiber and is emitted from its exit end so as to form a respective secondary beam, each of said portions corresponding to a different point of the cross section of said light beam;

b) introducing an angular spectral dispersion on said secondary beams by means of at least one dispersive element;

c) propagating the dispersed secondary beams in such a way that they overlap to form an interferogram;

d) acquiring an image of said interferogram; and e) extracting from said image of said interferogram an item of information relating to the spatial variation of the phase of said light beam at a plurality of wavelengths.

One speaks of "item of information" relating to the spatial variation of the phase because, in certain embodiments of the invention, this spatial variation of the phase is not completely determined, in particular because of aforementioned phase fluctuations introduced by the optical fibers.

It is important to note that, if no particular precaution is taken, the fact of escalating the number of optical fibers, and therefore of points of light acquisition, is liable to cause a serious difficulty. Indeed, several pairs of fibers may form similar interference patterns, whose Fourier transforms overlap (one then speaks of "degeneracy"). In this case, it becomes impossible to extract the phase differences from the interferogram. To overcome this difficulty, it is proposed, especially, to adjust the optical path lengths of the portions of the beam to be characterized acquired by various fibers, in such a way that they are not all equal to one another. Other possibilities exist for suppressing degeneracies, for example by acting on the positions of the exit ends of the optical fibers, but they are less flexible and more difficult to implement.

According to a preferred embodiment of the invention, it is possible to adjust the optical path lengths of said portions of the light beam by adjusting the position of the entry ends of said optical fibers in the direction of propagation of said beam. As a variant or supplement, it would be possible to use optical fibers of different lengths.

The operations for processing the data applied to the image of the interferogram must also be modified with respect to that known from the to aforementioned publications relating to the SEA TADPOLE scheme. In particular, said step e) can comprise:

e1) the calculation of a two-dimensional Fourier transform of said image of said interferogram;

e2) the identification of at least N−1 peaks of said two-dimensional Fourier transform, each of which is representative of the interference between two, and only two, spectrally dispersed secondary beams; and e3) for each of said peaks, and for a plurality of wavelengths, the determination of the phase difference between the two corresponding secondary beams, each said phase difference being corrected of said differences between the optical path lengths.

Just like the conventional SEA TADPOLE technique, the method of the invention can also provide for steps consisting in:

f) measuring the spectral phase of said light beam at a point of said light beam (for example by one of the SPIDER or FROG schemes); and g) obtaining an item of information relating to the spectral phase of said portions of said light beam on the basis of the item of information extracted in step e) and of the spectral phase measured in step f).

In particular, step f) can comprise the measurement of the spectral phase of said light beam at a point corresponding to the entry end of one of said optical fibers.

As a variant, it is possible to proceed in the following manner:

a reference pulse, whose spectral phase is known, is injected into an additional monomodal optical fiber, said pulse being emitted by an exit end of said fiber so as to form an additional secondary beam;

an angular spectral dispersion is introduced on said additional secondary beam by means of said or of each said dispersive element;

said spectrally dispersed additional secondary beam is made to propagate so that it is superimposed with said secondary beams, in such a way as to contribute to the formation of said interferogram;

on the basis of said image of the interferogram and of the known spectral phase of said reference pulse, an item of information relating to the spectral phase of said portions of said light beam is determined.

A method according to a particular embodiment of the invention can also comprise the following steps:

h) injecting into said optical fibers, simultaneously with said light beam, a reference light beam, shifted spectrally with respect to said light beam and whose spatio-spectral (or spatio temporal) properties are known, so as to form a second interferogram and acquire an image thereof;

i) determining, on the basis of the image of said second interferogram, fluctuations of phases introduced by said optical fibers; and j) using the phase fluctuations thus determined to correct the item of information extracted during step e).

These three additional steps make it possible to obtain a complete reconstruction of the beam to be characterized, including its phase fronts, circumventing random phase fluctuations introduced by the optical fibers. This is a major advantage with respect to the conventional SEA TADPOLE technique.

According to various particular embodiments of the invention:

The method can also comprise a step of calibration by means of a reference light beam, whose spatio-spectral properties are known and, preferably, whose spectrum encompasses that of the light beam to be characterized.

The exit ends of said optical fibers can be aligned in a direction perpendicular to a direction of spectral dispersion of said dispersive element.

The entry ends of said optical fibers can be arranged along a line, or else according to a two-dimensional pattern.

The positions of the exit ends of said optical fibers and the delays introduced can be chosen in such a way that, by representing each optical fiber by a point in a position-delay plane, a polygon- or "V"-shaped pattern is obtained.

Said light beam can be a laser beam comprising at least one picosecond or femtosecond laser pulse.

Another subject of the invention is a device for characterizing a light beam comprising:

N≥3 monomode optical fibers each exhibiting an entry end and an exit end;

a first support for positioning the entry ends of said optical fibers on the route of said light beam, in such a way that a respective portion of said beam is coupled and propagates in each optical fiber, said first support comprising means for adjusting the position of the entry ends of said optical fibers in the direction of propagation of said beam;

a spectrometer comprising a dispersive element;

a second support for positioning the exit ends of said optical fibers in such a way that secondary beams emitted by said exit ends are dispersed angularly by said dispersive element and overlap to form an interferogram; and a sensor for acquiring an image of said interferogram.

According to various embodiments of such a device:

Said second support is adapted for aligning the exit ends of said optical fibers facing an entry slit of said spectrometer and parallel to said slit.

Means for processing the data can be provided so as to extract from said image of said interferogram an item of information relating to the spatial variation of the phase of said light beam at a plurality of wavelengths. The data processing means can, advantageously, consist of or comprise a computer programmed in an opportune manner.

BRIEF DESCRIPTION OF THE DRAWINGS

Other characteristics, details and advantages of the invention will emerge on reading the description offered with reference to the appended drawings given by way of example and which represent, respectively:

FIGS. 3A and 3B, respectively, an interferogram obtained with the setup of FIG. 2, and a Fourier transform comprising three components in the (ω, k) plane;

FIGS. 4A and 4B, an interferogram obtained with the setup of FIG. 2 and its two-dimensional Fourier transform;

FIGS. 5A and 5B, respectively, an interferogram obtained with the setup of FIG. 2 and its two-dimensional Fourier transform, a delay $\tau_0$ having been introduced between the two interfering beams;

DETAILED DESCRIPTION

Figure 1A:
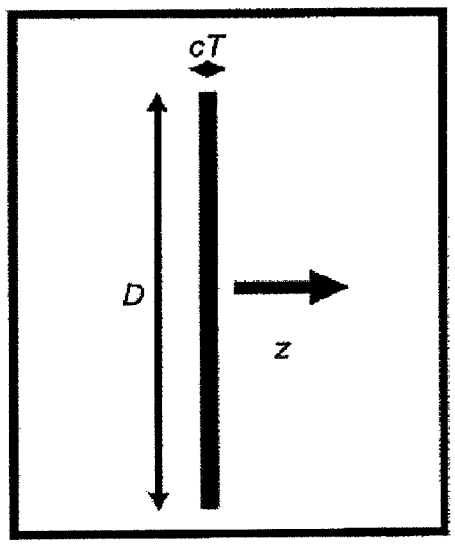
FIGS. 1A and 1B illustrate a distortion of the intensity front of a pulsed beam resulting from spatio-temporal couplings.

To describe the invention in detail, it is appropriate to return to the simple case in which only two optical fibers F1 and F2 are used, whose entry ends are arranged on the route of a light beam and whose exit ends are laid out facing the entry slit of a spectrometer to form an interferogram whose intensity distribution is given by equation (1):

$$S(\omega,X) = S_{aux}(\omega) + S_{inc}(\omega) + 2\sqrt{S_{aux}(\omega)S_{inc}(\omega)}\cos(2\omega \sin\theta X/c + \phi_{inc}(\omega) - \phi_{aux}(\omega))$$

and represented in FIG. 4A.

Instead of performing a unidimensional Fourier transform of the function $S(\omega,X)$ with respect to ω, as in the case of the SEA TADPOLE technique, it is advantageous to perform a two-dimensional Fourier transform thereof ("TF2D"), that will be expressed $Q(\tau,k)$. As shown by FIG. 4B, the function $Q(\tau,k)$ is essentially composed of three peaks: a central peak $P_0$, which corresponds to the envelope of the interferogram, and two lateral peaks $P_{-1}$, $P_{+1}$ which correspond to the fringes and which contain the sought-after phase item of information. In the (τ,k) plane, the peaks $P_{-1}$, $P_0$, $P_1$ are aligned along the k axis.

Now, a temporal shift or delay $\tau_0$, for example of 200 fs, is introduced between the so-called "secondary" beams, issuing from two fibers. This delay can be generated simply by translating the entry end of one of the two fibers with respect to the other, along the direction of propagation of the beam, in such a way that the routes traveled by the light in the air, before entering the fibers, are slightly different.

In this case, the expression for the interferogram $S(\omega,X)$ becomes:

$$S(\omega,X) = S_{aux}(\omega) + S_{inc}(\omega) + 2\sqrt{S_{aux}(\omega)S_{inc}(\omega)}\cos(2\omega \sin\theta X/c + \omega\tau_0 \phi_{inc}(\omega) - \phi_{aux}(\omega))) \quad (4)$$

As illustrated in FIG. 5A, with respect to the case without delay, the fringes have rotated in the (ω,X) plane. Stated otherwise, the fringes are no longer simply spatial, but "spatio-spectral".

When the two-dimensional Fourier transform $Q(\tau,k)$ of this interferogram is calculated, the result illustrated in FIG. 5B is obtained. On account of the rotation of the fringes in the (ω,X) plane, the peak $P_{+1}$ is displaced to $(\tau,k) = (\tau_0, 2\omega \sin\theta/c)$, and the peak $P_{-1}$ to the symmetric point with respect to the origin. Qualitatively, the positions of these peaks correspond to the vector (τ,d) linking the exit ends of the fibers in a space (t, r), where r is the transverse spatial coordinate in the exit plane of the fibers, and to its opposite. s By altering the delay between the two fibers, it is therefore possible to translate the peaks corresponding to the interferences in the Fourier plane, along the τ axis.

The beam to be characterized can be a pulsed beam, characterized by a pulse duration on the femtosecond scale. However, the pulse is stretched by the dispersive element of the spectrometer; consequently, the delay $\tau_0$ can be greater than said pulse duration.

As will be clearly apparent subsequently, these considerations are significant for the understanding of the invention.

Figure 6:
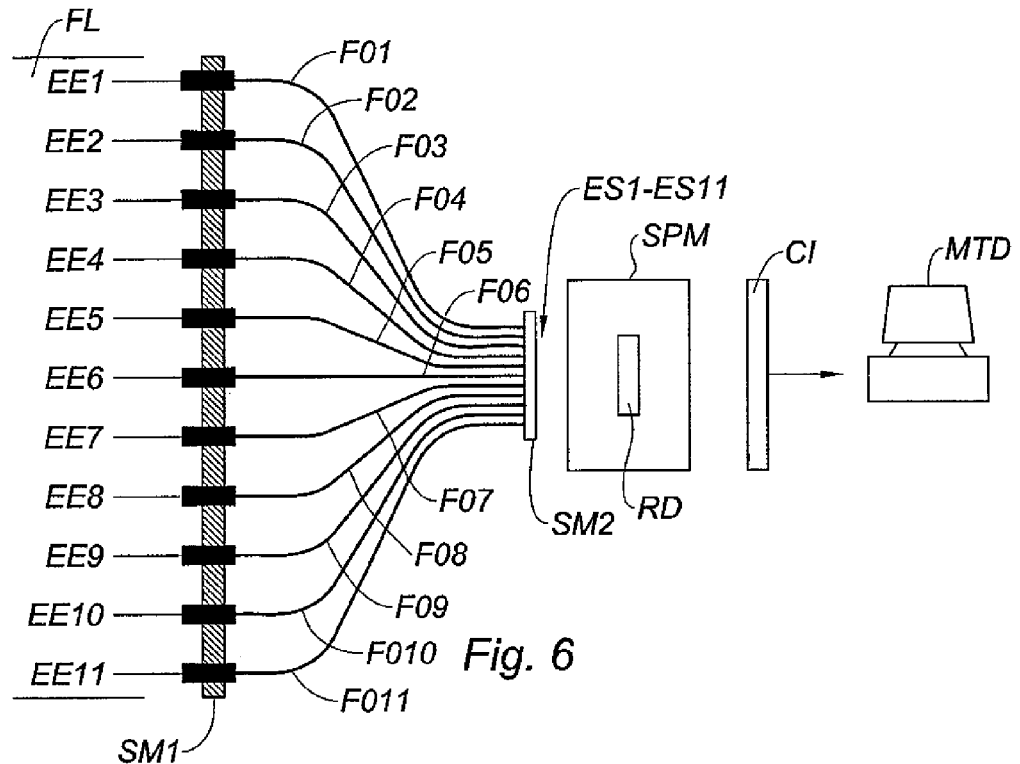
FIG. 6, a device according to one embodiment of the invention.
Figure 7:
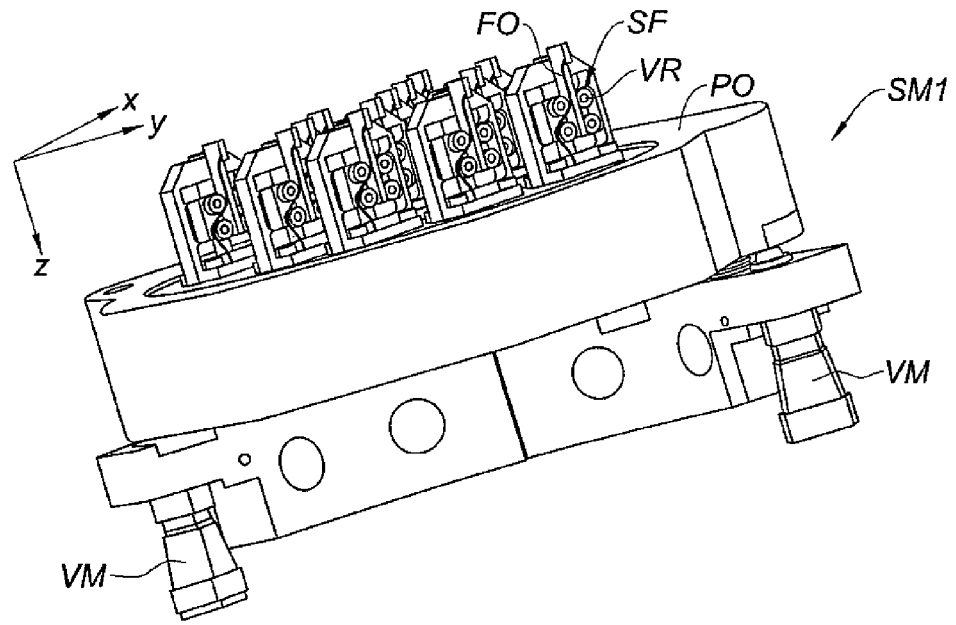
FIG. 7, a detail view of the device of FIG. 6, showing a mechanical support for holding the entry ends of the optical fibers.

FIG. 6 shows a very schematic representation of a device according to the invention. This device comprises N=11 monomodal optical fibers FO1-FO11, whose entry ends EE1-EE11 are carried by a first mechanical support SM1, an embodiment of which is represented in FIG. 7. As shown by this figure, the support SM1 comprises a stage PO, orientable by means of micrometric screws VM, in the manner of a mirror support; the stage is intended to be positioned on the route of the beam FL to be characterized, its surface being oriented perpendicularly to the direction (z) of propagation of the beam. Individual supports SI are fixed to the surface of the stage to hold the entry end of an optical fiber FO oriented perpendicularly to said surface, so as to allow the coupling of a respective portion of the beam to be characterized. Screws VR make it possible to finely adjust the distance between the entry end of each fiber and the surface of the stage, and to introduce delays between the various portions of the beam. Typically, the delays introduced will lie between a few tens of femtoseconds and a few picoseconds; consequently, the individual supports will have to make it possible to advance or retreat the optical fibers along the z axis by several tens or hundreds of micrometers, with a tolerance of the order of a micrometer.

The optical fibers FO1-FO11 ideally exhibit identical lengths; however, the inevitable dispersion in their lengths can be compensated by acting on the longitudinal position of the entry ends, during a preliminary calibration step.

To characterize pulses of very brief duration (less than 10 fs), or more generally beams with very wide band, it is possible to use photonic-crystal fibers instead of conventional optical fibers.

Figure 2:
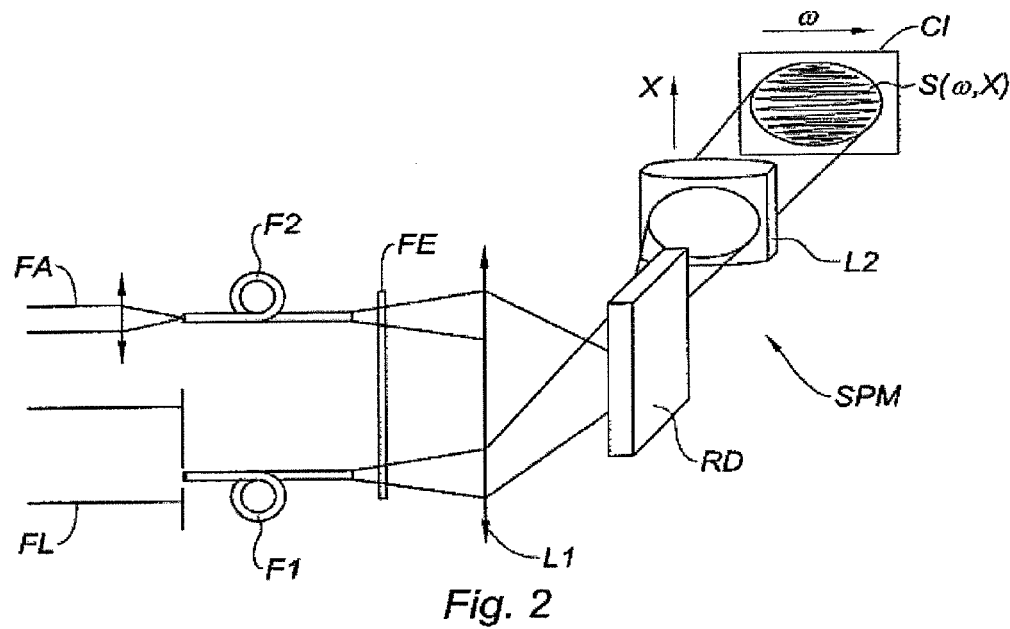
FIG. 2 shows a prior art apparatus for measuring the spatio-temporal couplings.

The exit ends ES1-ES11 of the fibers FO1-FO11 are placed side by side along a line, and held in place by a second mechanical support SM2. In the embodiment of FIG. 6, they are very close together (distance between closest neighbors of the order of 100 μm), so that the "secondary" beams (issuing from the fibers) overlap spatially; as a variant or supplement it would be possible to use a lens—as in the case of FIG. 2—or even a concave mirror to ensure such an overlap.

The ends ES1-ES11 are aligned facing the entry slit of a spectrometer SPM (or themselves constitute such a slit), comprising a dispersive element RD which angularly disperses the secondary beams issuing from the optical fibers. As in the case of the SEA TADPOLE technique, the dispersed beams form an interferogram, an image of which is acquired by virtue of a sensor of CCD type, identified by the reference CI. A means MTD for processing the data, such as a computer programmed in an opportune manner, extracts the image of the interferogram so as to process it in the manner which will be described hereinafter.

Figures 8A, 8B:
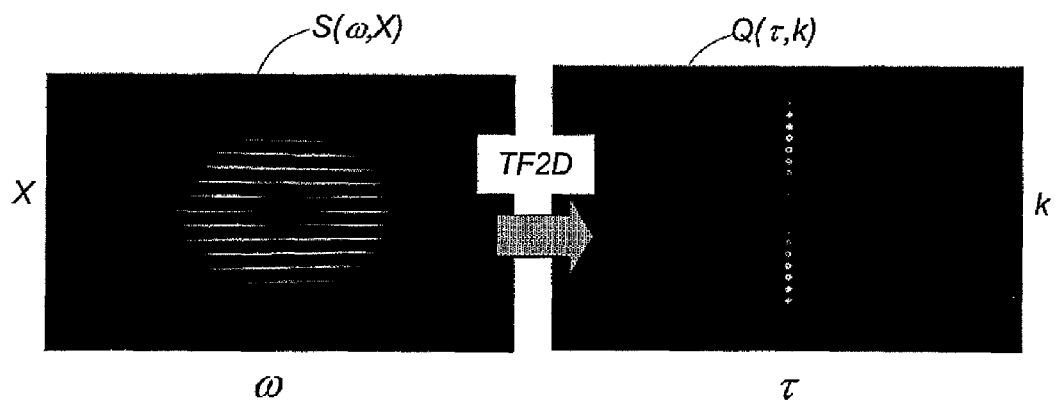
FIGS. 8A and 8B, respectively, an interferogram obtained with the setup of FIG. 2 and its two-dimensional Fourier transform, illustrating the problem of degeneracies.

The interferogram observed is much more complex than in SEA TADPOLE, on account of the presence of N fibers instead of simply two. FIG. 8A shows such an interferogram in the case where the delay $\tau_0$ is zero (the entry ends of the fibers are therefore situated on a plane perpendicular to the z axis), and FIG. 8B its two-dimensional Fourier transform.

With N=11, it ought to be possible to identify N(N−1)+1=111 peaks in the Fourier plane (τ,k): a central peak corresponding to the envelope of the signal, and N(N−1)=110 peaks corresponding to the interferences between the N(N−1)/2=55 distinct pairs of fibers (since there are two peaks in the Fourier plane for each interference term). But, only P=21 peaks (a central peak and ten pairs of lateral peaks) can be distinguished in FIG. 8B.

This case illustrates the problem of "degeneracy", already mentioned above. Indeed, all the pairs of first neighbor fibers are situated the same distance apart and therefore give fringes of the same periodicity; in the Fourier transform of FIG. 8B, this is manifested by the superposition of 10 peaks—as many as pairs of first neighbors. The same phenomenon occurs for the second neighbors, and so on and so forth. Consequently, all the peaks observed in FIG. 8B correspond to a superposition of several interference terms, except the two end peaks, which correspond to the interferences between the two most distant fibers (since only two fibers are situated this distance apart). Under these conditions, it is not possible to determine the relative phases of the portions of the beam to be characterized which are associated with the various fibers, since the peaks corresponding to each term of interference between pairs of secondary beams can no longer be filtered independently in the two-dimensional Fourier transform of the interferogram. Accordingly, it is necessary to remove, at least in part, the degeneracies, by contriving matters so that the smallest possible number of pairs of fibers are separated by equal or neighboring vectors (Δτ, Δr) in the (τ,r) plane.

A first way of proceeding is to arrange the exit ends of the fibers in space (radial coordinate r, introduced previously, in the exit plane of the fibers) in a more complex manner, in such a way that two pairs of fibers are never the same distance d apart. However, this condition is very difficult to satisfy.

Figure 1B:
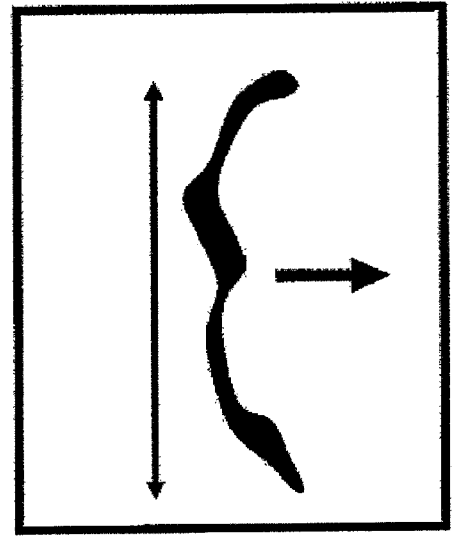

Another possibility, which is much more practical to implement, consists in utilizing the whole of the Fourier plane (τ,k), which is two-dimensional, instead of restricting oneself to a line. It will thus be possible to separate the N(N−1) interference terms much more easily, and prevent them from overlapping even partially. To achieve this, it suffices to introduce a delay between the exits of the various fibers. In practice, as already underlined, this can be achieved very simply by translating the entry ends of the fibers along the direction of propagation of this beam (z direction in FIG. 1). As a variant or supplement, it would be possible to use fibers of different lengths, but this presupposes that these lengths are controlled in a very precise manner.

It has been shown above that the effect of introducing such a delay is to induce a rotation of the fringes in the (ω,X) plane, and therefore a translation of the associated peak along the τ axis in the Fourier plane (τ,k). It is therefore possible to use this parameter to displace the interference peaks in the (τ,k) plane, and thus avoid degeneracies. It then suffices to find an arrangement of the fibers in space (spatial coordinate r in the plane of the exit ends of the fibers) and in time τ, such that all the pairs of fibers (or, at least, a sufficient number of these pairs) are separated by different vectors (Δt, Δr).

Figure 9:
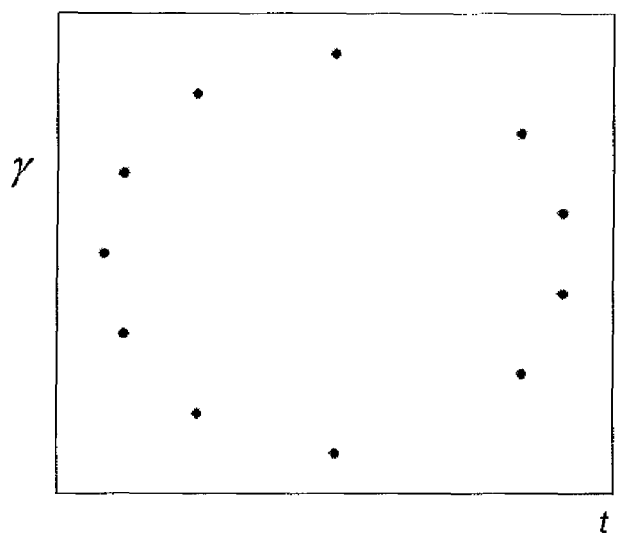
FIG. 9, a first layout of the entry ends of the optical fibers of the device of FIG. 6, making it possible to solve the problem of degeneracies.

An example of such an arrangement is presented in FIG. 9, for N=11 fibers. Each fiber can be represented by a point in a plane whose coordinates are the delay τ and the position of its exit end, r. In the (τ,r) plane, these points form a polygon. More precisely, the exit ends of the fibers are arranged regularly along a line, every 100 microns. The delays τ follow the law:

$$\tau(i) = (-1)^i \tau_{max} \sqrt{1 - [2(i-1)/(N-1) - 1]^2}$$

where i (=1 to N) is the fiber index, and $\tau_{max}$ the maximum delay between the first fiber and all the others (2750 fs in the present case). When N is odd, this configuration makes it possible to remove all the degeneracies, as will be shown hereinafter. When N is even, a few degeneracies persist.

Figures 10A, 10B:
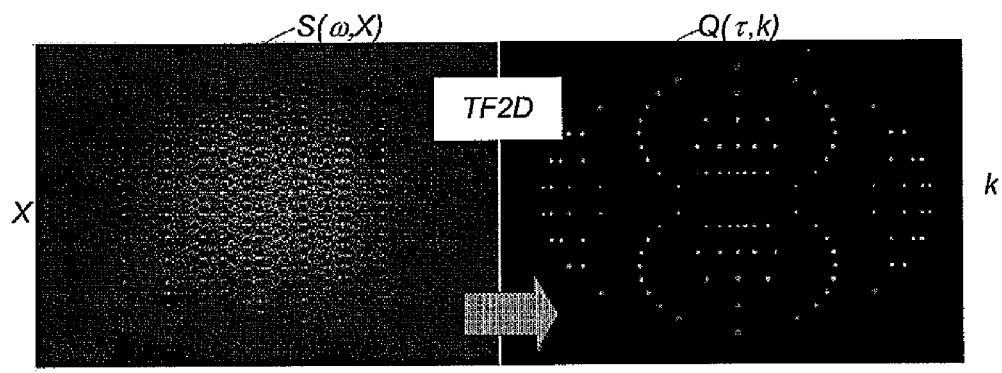
FIGS. 10A and 10B, respectively, an interferogram obtained with the layout of FIG. 9, and its two-dimensional Fourier transform, not showing any degeneracies.

This arrangement gives the interferogram of FIG. 10A, which is extremely complex on account of the large number of interference terms involved. Its two-dimensional Fourier transform, presented in FIG. 10B, exhibits N(N−1)+1=111 well separate peaks: N(N−1)=110 peaks corresponding to the interferences between the N(N−1)/2=55 distinct pairs of fibers, and 1 central peak corresponding to the envelope of the signal. Any degeneracy is therefore avoided by virtue of the delays introduced between the fibers.

Figure 11:
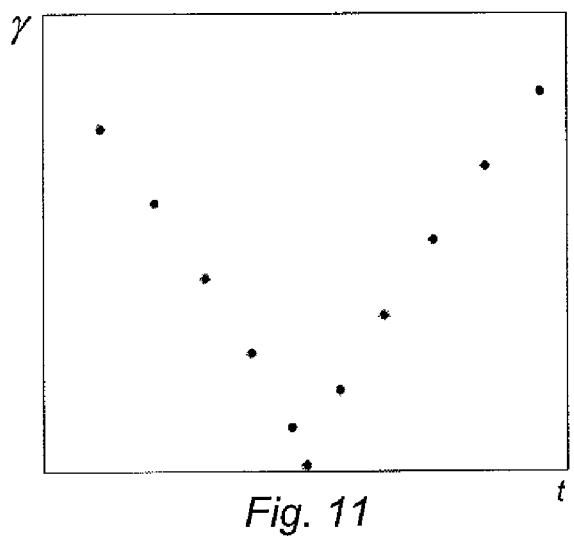
FIG. 11, a second layout of the entry ends of the optical fibers of the device of FIG. 6, making it possible to solve in part the problem of degeneracies.

Other arrangements of the fibers in the (τ,r) plane are also possible, such as that represented in FIG. 11. In this case, the delay between the fibers is given by the formula:

$$\tau(i) = (-1)^i i^\beta \tau_0$$

where i=1 to N is the fiber index, with here β=1.2 and $\tau_0$=180 fs. As in the previous case, the exit ends of the fibers are regularly spaced along a line in space, thereby making it possible to have a setup that is very simple to achieve. On the other hand, in the (τ,x) plane, the points representing the various fibers now form a curved (when β≠1) "V" instead of a polygon.

Figures 12A, 12B:
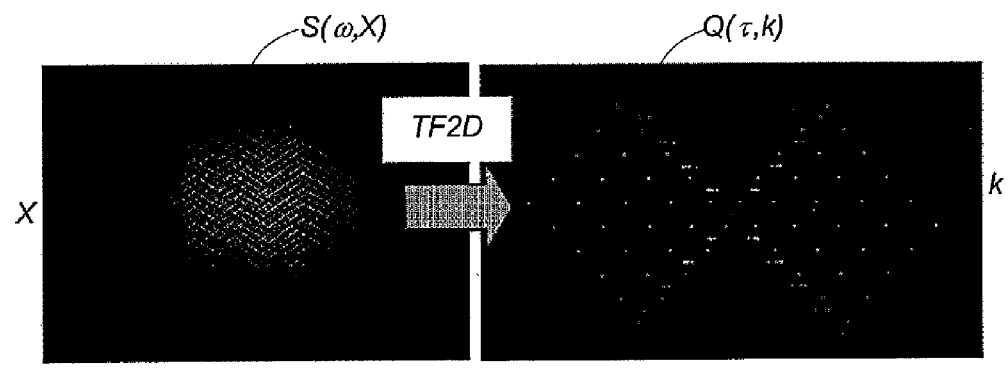
FIGS. 12A and 12B, respectively, an interferogram obtained with the layout of FIG. 10, and its two-dimensional Fourier transform, showing a partial removing of degeneracies.

The corresponding interferogram and its two-dimensional Fourier transform are plotted in FIGS. 12A and 12B, respectively. It is noted that in this case degeneracies remain, for example between second neighbors (second lines above and below the central point in FIG. 12B). But this is not a problem, since the information contained in the interferogram is redundant, given that all the fibers are "compared" with all the others. In particular, there is no degeneracy between first neighbors (first lines above and below the central point), thereby making it possible to fully determine les phase differences between all the fibers: all the phase differences $\Delta\phi_{i+1} = \phi_{i+1}(\omega) - \phi_i(\omega)$ for i=1 to N−1 are known. Therefore knowing $\phi_1(\omega)$, for example, (determined by a local FROG or SPIDER measurement, at the point of collection of the fiber 1), it will be possible to determine all the $\phi_i(\omega)$ for i=1 to N.

From a more general point of view, it is assumed that the measurement makes it possible to separate 2P peaks in the two-dimensional Fourier transform of the interferogram, and thus to measure P phase differences between the N fibers. The aim is to determine, on the basis of these measurements, the N spectral phases $\phi_k(\omega)$ (k=1 to N) at the exit of all the fibers, by assuming that simply one of them, $\phi_1(\omega)$, is known. It is therefore necessary to determine N unknowns by means of P+1 data (the P measured differences and the phase $\phi_1(\omega)$, assumed known). The problem is linear, and it is therefore necessary (but not sufficient) to have P+1≥N, therefore P≥N−1, that is to say to have a number of isolated peaks in the Fourier plane greater than 2(N−1), in addition to the central peak.

It is assumed that this condition P≥N−1 is fulfilled. Therefore, we have P≥N−1 measured data $\Delta\phi_k$ (k=1 to P), which are related to the unknowns $\phi_i(\omega)$ through the elementary equation $\Delta\phi_k=\phi_i(\omega)-\phi_j(\omega)$. Out of the P measured data, N−1 thereof can be chosen so as to write a system of linear equations making it possible to find the N unknowns $\phi_i(\omega)$. This system can be cast into a matrix form. Accordingly the data vector of length N is defined, $D=(\phi_1(\omega), \Delta\phi_k(\omega))$, where k=1 to N−1 is an index listing the N−1 data measured by virtue of the interferogram. For every k, there is a fiber index pair p and q such that $\Delta\phi_k(\omega)=\phi_p(\omega)-\phi_q(\omega)$. The vector of unknowns of length N, $I=(\phi_i(\omega))$ (i=1 to N) is defined. The system of equations to be solved can therefore be written D=M I, where M is an N×N matrix whose elements are:

$M_{11}=1$
$M_{1i}=0$ for every i≠1
$M_{(k+1)p}=1$
$M_{(k+1)q}=-1$
$M_{(k+1)i}=0$ for i not in the set (p,q)

This system has a unique solution if and only if the matrix M can be inverted, and therefore if its determinant is not zero (Det M≠0). From a more physical point of view, it is understood that this condition is satisfied if each of the (N−1) fibers contributes to at least one of the N−1 selected peaks.

Thus, in order for the P data extracted from the interferogram to be sufficient to reconstruct the spatio-spectral phase of the laser beam, it is necessary and it suffices that it be possible to extract therefrom a number N−1 of data, such that the matrix M can be inverted (Det M≠0). It is entirely possible, in certain cases, for several subsets of data to satisfy this condition. There is then an information redundancy, which can be utilized either to improve the signal-to-noise ratio, or to test the coherence of the measurement.

The entry ends of the fibers (apart from their relative shift in the z direction) can be arranged in a straight line, thereby allowing characterization of the light beam in one dimension. As a variant, they may be arranged in a two-dimensional pattern (regular or not), so as to characterize the beam in two spatial dimensions with a single interferogram.

Before being able to perform measurements, the multifiber interferometer of FIG. 6 must be calibrated or gauged, this requiring a well characterized source. The simplest possibility consists in using a monomode fibered laser source with "large" spectral width, which makes it possible to obtain a reference image in the Fourier plane. The beams which will thereafter be characterized with this system will be so by comparing the interferogram obtained in the Fourier plane with this reference. This reference source can also be used to adjust the delays between the fibers, so as to compensate the errors due to the tolerances on the lengths of the fibers.

Once the probe has been calibrated, it is used to measure an interferogram obtained on the basis of the source to be characterized. By analyzing the picture obtained in the Fourier plane, and by comparing it with the reference image, we obtain the spatial variation of the phase $\phi(x,y,\omega)$ at the N measurement points $(x_i,y_i)$, for all the frequencies $\omega$ of the beam. The spatial variations of the spectrum $|E(x,y,\omega)|$, which likewise are required in order to reconstruct the beam, are also extracted from these measurements.

At this juncture, the variation of $\phi(x,y,\omega)$ with $\omega$ is not yet known. The structure of the pulse (and its arrival time) have merely been compared at various points: this is just a relative measurement. This is however sufficient if one simply wishes to determine the spatial variations of the beam. To obtain a better characterization, it is necessary to determine the spectral phase $\phi(x,y,\omega)$ at one point at least. This can be done by performing a SPIDER or FROG measurement for example, at a point of the beam, corresponding to one of the points of collection by the array of fibers.

Another possibility consists in providing an $(N+1)^{th}$ fiber whose exit end is, likewise, arranged facing the entry slit of the spectrometer, and in injecting into its entry end a reference pulse whose spectral phase is known. Up to 2N additional peaks are thus obtained in the two-dimensional Fourier transform of the interferogram. By applying the processing scheme described hereinabove, the spectral phase of the secondary beams issuing from the other fibers is compared with that of the reference pulse. It is therefore not necessary to use measurements of SPIDER or FROG type (except to characterize the reference pulse, but this constitutes a calibration operation which need not necessarily be repeated for each measurement).

In theory, this ought to make it possible to reconstruct the beam E(x,y,t) in three dimensions, by performing a Fourier transform of $E(x,y,\omega)=|E(x,y,\omega)|\,e^{i\Phi(x,y,\omega)}$ on the variable $\omega$.

In reality, this is not generally the case, since the propagation in the optical fibers introduce random phase fluctuations, varying over time. The measurement method described hereinabove therefore makes it possible to determine the phase $\phi(x,y,\omega)$ only to within a term $\phi_{fluct}(x,y,\omega)$. Given that this unknown term $\phi_{fluct}(x,y,\omega)$ can generally be considered independent of the frequency $\omega$, this is already sufficient for certain applications (for example, to determine the intensity fronts), but not for all. This problem arises in a similar manner within the framework of the invention as in that of the conventional SEA TADPOLE technique.

A possible solution consists in injecting simultaneously into the fibers a second, so-called reference, light beam of the same spatial extent as the unknown beam, but shifted spectrally, of known spatial properties and typically free of spatio-temporal couplings. This type of beam can be produced relatively easily today, for example by means of a monomode fibered laser source with large spectral width.

Figure 13:
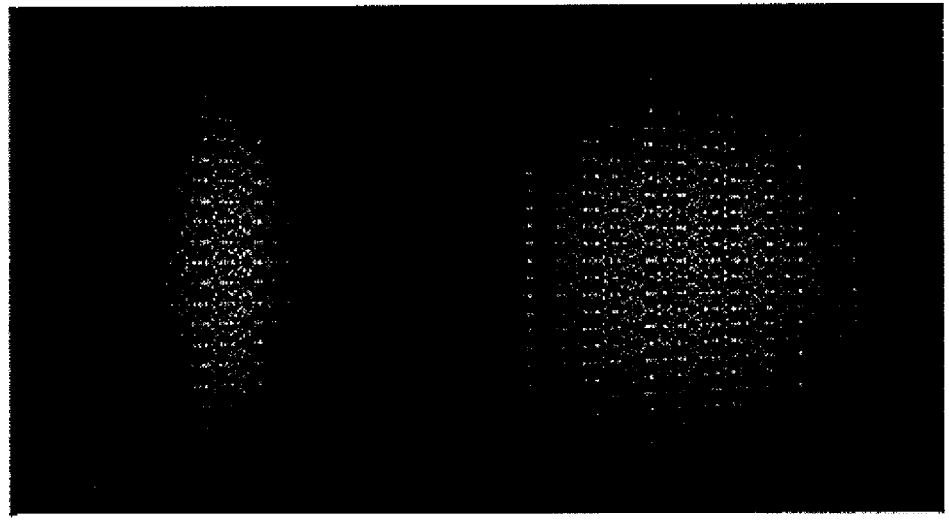
FIG. 13, a double interferogram obtained after the addition of a reference beam.

Two distinct interferograms, $S_1$ and $S_2$, separated in the direction of dispersion of the spectrometer are then obtained, as represented in FIG. 13. The interferogram $S_1$ corresponds to the source to be characterized and the interferogram $S_2$ corresponds to the reference source. If the reference beam is well characterized (in the simplest case: plane or spherical wavefronts, identical for all the frequencies of the spectrum) the phase $\phi(x,y,\omega)$ which has to be measured is known. Any discrepancy is therefore due to the phase fluctuations in the fibers. It is then possible to use this signal to determine these fluctuations over the spectral range of the reference. It is thereafter possible to extrapolate these measured fluctuations over the spectral span of the beam to be characterized, assuming them to be independent of frequency. It has been verified experimentally that this assumption is reasonable.

This correction can be applied either to the standard SEA TADPOLE scheme, or to the scheme of the invention. In both cases, the approach for correcting the fluctuations is the same. The difference is that in one case the fluctuations are corrected in the course of time, while the fiber is being displaced, whereas in the other, the random phase fluctuations between N fibers are corrected.

The device and the method of the invention have been described with reference to their application to the characterization of pulsed laser beams, but this application is not exclusive. Indeed, in a more general manner, this device and this method afford access to the quantity known by the name "cross-spectral density" of the beam studied, that is to say to the function of two spatial variables $x_1$ and $x_2$ and of the frequency ω:

$$W(x_1,x_2,\omega)=E(x_1,\omega)E^*(x_2,\omega)$$

where E(x,ω) is the (complex) spectrum of the field at the point x and "*" indicates the complex conjugation operation. The device of the invention makes it possible to sample this function for all the pairs of points $(X_i,X_j)$ of the beam that are associated with pairs of fibers which correspond to a non-degenerate peak in the two-dimensional Fourier transform of the interferogram.

The function $W(x_1,x_2,\omega)$ is significant because it contains all of the information on the second-order spatial and temporal coherence properties of the beam. It is related to the degree of spectral coherence $\mu(x_1,x_2,\omega)$, of modulus lying between 0 and 1, through the relation:

$$\mu(x_1,x_2\omega)=W(x_1,x_2,\omega)/[W(x_1,x_2,\omega)W(x_1,x_2,\omega)]^2$$

Thus, the device of the invention makes it possible to perform a simultaneous measurement of coherence at several points of the beam. For example such a device can be used, in combination with a wide-spectrum incoherent source to determine the "spatio-spectral" response of complex optical systems.

The invention claimed is:

1. A method for characterizing a light beam comprising the steps:
    a) arranging the entry ends of N≥3 optical fibers on the route of said light beam, in such a way that a respective portion of said beam is coupled and propagates in each optical fiber and is emitted from its exit end so as to form a respective secondary beam, each of said portions corresponding to a different point of the cross section of said light beam;
    b) introducing an angular spectral dispersion on said secondary beams by at least one dispersive element;
    c) propagating the spectrally dispersed secondary beams in such a way that they overlap to form an interferogram;
    d) acquiring an image of said interferogram; and
    e) extracting from said image of said interferogram an item of information relating to the spatial variation of the phase of said light beam at a plurality of wavelengths
    in which the optical path lengths of said portions of said light beam are adjusted in such a way that they are not all equal to one another; and
    in which said step e) comprises:
    e1) the calculation of a two-dimensional Fourier transform of said image of said interferogram;
    e2) the identification of at least N−1 peaks of said two-dimensional Fourier transform, each of which is representative of the interference between two, and only of two, spectrally dispersed secondary beams; and
    e3) for each of said peaks, and for a plurality of wavelengths, the determination of the phase difference between the two corresponding secondary beams, each said phase difference being corrected of said differences between the optical path lengths.

2. The method as claimed in claim 1, in which the optical path lengths of said portions of the light beam are adjusted by adjusting the position of the entry ends of said optical fibers in the direction of propagation of said beam.

3. The method as claimed in claim 1 also comprising the steps:
    f) measuring the spectral phase of said light beam at a point of said light beam; and
    g) obtaining an item of information relating to the spectral phase of said portions of said light beam on the basis of the item of information extracted in step e) and of the spectral phase measured in step f).

4. The method as claimed in claim 1 in which:
    a reference pulse, whose spectral phase is known, is injected into an additional monomodal optical fiber, said pulse being emitted by an exit end of said fiber so as to form an additional secondary beam;
    an angular spectral dispersion is introduced on said additional secondary beam by said dispersive element;
    said spectrally dispersed additional secondary beam is made to propagate so that it is superimposed with said secondary beams, in such a way as to contribute to the formation of said interferogram;
    on the basis of said image of the interferogram and of the known spectral phase of said reference pulse, an item of information relating to the spectral phase of said portions of said light beam is determined.

5. The method as claimed in claim 1, also comprising the following steps:
    h) injecting into said optical fibers, simultaneously with said light beam, a reference light beam, shifted spectrally with respect to said light beam and whose spatial properties are known, so as to form a second interferogram and acquire an image thereof;
    i) determining, on the basis of the image of said second interferogram, fluctuations of phases introduced by said optical fibers; and
    j) using the phase fluctuations thus determined to correct the item of information extracted during step e).

6. The method as claimed in claim 1, also comprising a step of calibration by means of a reference light beam, whose spatial properties are known.

7. The method as claimed in claim 1, in which the exit ends of said optical fibers are aligned in a direction perpendicular to a direction of spectral dispersion of said dispersive element.

8. The method as claimed in claim 1, in which the entry ends of said optical fibers are arranged along a line.

9. The method as claimed in claim 1, in which the entry ends of said optical fibers are arranged according to a two-dimensional pattern.

10. The method as claimed in claim 1, in which the positions of the exit ends of said optical fibers and the delays introduced are chosen in such a way that, by representing each optical fiber by a point in a position-delay plane, a polygon- or "V"-shaped pattern is obtained.

11. The method as claimed in claim 1, in which said light beam is a laser beam comprising at least one picosecond or femtosecond laser pulse.

12. A device for characterizing a light beam comprising:
    N≥3 monomode optical fibers each exhibiting an entry end and an exit end;
    a first support for positioning the entry ends of said optical fibers on the route of said light beam, in such a way that a respective portion of said beam is coupled and propagates in each optical fiber, said first support comprising means for adjusting the position of the entry ends of said optical fibers in the direction of propagation of said beam;

a spectrometer comprising a dispersive element;

a second support for positioning the exit ends of said optical fibers in such a way that secondary beams emitted by said exit ends are dispersed angularly by said dispersive element and overlap to form an interferogram; and a sensor for acquiring an image of said interferogram;

in which the optical path lengths of said portions of said light beam are adjusted in such a way that they are not all equal to one another; and also comprising means for processing the data so as to extract from said image of said interferogram an item of information relating to the spatial variation of the phase of said light beam at a plurality of wavelengths; said processing means comprising:

means for the calculation of a two-dimensional Fourier transform of said image of said interferogram means for the identification of at least N−1 peaks of said two-dimensional Fourier transform, each of which is representative of the interference between two, and only of two, spectrally dispersed secondary beams; and for each of said peaks, and for a plurality of wavelengths, means for the determination of the phase difference between the two corresponding secondary beams, each said phase difference being corrected of said differences between the optical path lengths.

13. The device as claimed in claim 12, in which said second support is adapted for aligning the exit ends of said optical fibers facing an entry slit of said spectrometer and parallel to said slit.

14. The device as claimed in claim 12, also comprising means for processing the data so as to extract from said image of said interferogram an item of information relating to the spatial variation of the phase of said light beam at a plurality of wavelengths.

* * * * *